United States Patent [19]
Broker

[11] 3,757,811
[45] Sept. 11, 1973

[54] PRESSURE REGULATOR

[75] Inventor: Erich Broker, Oelde, Germany

[73] Assignee: Paul Hammelmann Maschinenfabrik, Oelde/Westf., Germany

[22] Filed: Sept. 10, 1971

[21] Appl. No.: 179,294

[52] U.S. Cl. .............................. 137/116, 137/490
[51] Int. Cl. .......................................... F16k 31/38
[58] Field of Search.............. 137/102, 109, 115, 137/116, 116.3, 116.5, 118, 119, 111, 112, 114, 490; 132/509

[56] References Cited
UNITED STATES PATENTS

| | | |
|---|---|---|
| 2,642,887 | 6/1953 | Renick ............................. 137/116 |
| 3,451,416 | 6/1969 | Nyberg ............................ 137/116 |
| 2,967,485 | 1/1961 | Towler ............................. 137/115 |
| 3,441,043 | 4/1969 | Fronicke ......................... 137/108 |
| 3,457,941 | 7/1969 | Cook ............................... 137/116 |

FOREIGN PATENTS OR APPLICATIONS 423,587   1/1926   Germany .......................... 137/490

Primary Examiner—Martin P. Schwadron
Attorney—Michael S. Striker

[57] ABSTRACT

A pressure regulator has an overflow valve the valve body of which is configured as a stepped piston and cooperates with a spring-loaded bolt. Between the bolt and the stepped piston is located an actuating member which is connected in turn with a smaller-diameter valve needle and which controls the flow through an outlet channel in the stepped piston. In the region of their juncture the actuating member and valve needle are exposed to the fluid pressure at a user device to which the pressure regulator supplies fluid.

5 Claims, 2 Drawing Figures

PRESSURE REGULATOR

BACKGROUND OF THE INVENTION

The present invention is directed to a pressure regulator, and more particularly to a pressure regulator with an overflow valve.

Pressure regulators are of course already known, but the prior art does not provide a construction of this type in which the regulator can be readily adapted by exchanging a few components for a wide range of pressures.

SUMMARY OF THE INVENTION

It is, accordingly, a general object of the present invention to provide an improved pressure regulator.

More particularly it is an object of the invention to provide an improved pressure regulator having an overflow valve and which can be adapted, by exchanging readily a few components, for a wide pressure range of for instance 20–2,000 kp/cm$^2$.

In pursuance of the above objects, and of others which will become apparent hereafter, I provide a pressure regulator having an overflow valve whose valve body is configurated as a stepped piston and cooperates with a spring-loaded tension bolt. Located intermediate the tension bolt and the stepped piston is an actuating member which is connected with a smaller-diameter valve needle of which the latter controls fluid flow through an outflow channel provided in the stepped piston. At the juncture of valve needle and actuating member the two are exposed to the fluid pressure which prevails at a user device to which the pressure regulator supplies fluid.

Advantageously the actuating member is readily slidably guided and accommodated in an easily removable sleeve, and the valve needle in an easily removable plate similarly slidably mounted. In order to vary the pressure range which can be controlled by the pressure regulator it is only necessary to exchange the unit composed of actuating member and valve needle mounted in the sleeve and plate, respectively. A spring with relatively soft characteristic can be associated with the tension bolt for the entire pressure range.

The pressure regulator according to the present invention is characterized not only by the above advantages, but also by the fact that it is of compact construction and relatively small dimensions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
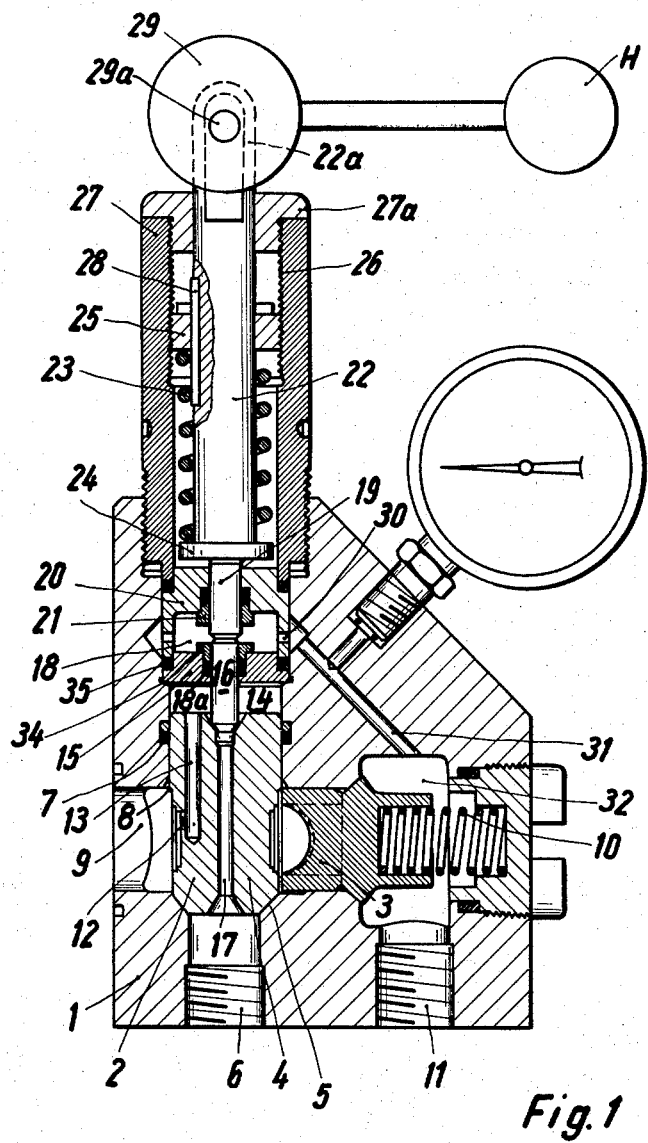
FIG. 1 shows in a somewhat diagrammatic sectional elevation an exemplary embodiment of the invention.

Discussing the drawing in detail it will be seen that reference numeral 1 identifies a housing which accommodates an overflow valve 2 and a one-way valve 3.

The valve body of the overflow valve 2 is constructed as a stepped piston 4 which in the illustrated position is pressed against the valve seat 5 and thereby closes the outlet 6.

The upper portion of the stepped piston 4, which is slidably mounted in the sealing element 7, is of a larger diameter than the lower portion whose diameter corresponds to the outer diameter of the valve seat 5. As a result of the difference in diameters between the upper and lower portions of the stepped piston 4, the latter is provided with an annular shoulder 8 which is continuously exposed to the working pressure fluid which is supplied from a non-illustrated source to the inlet 9. This incoming fluid — preferably, but not necessarily water — flows around the stepped piston 4 and upon achieving requisite working pressure it opens the one-way valve 3 counter to the biasing force of a spring 10. When this takes place, the fluid flows to a non-illustrated user device via the outlet 11.

At the same time liquid from the inlet 9 also flows through a throttle opening 12 and a channel 13 into a control chamber 14 where it develops a working pressure. The chamber 14 is defined at one end by the upper end face of the stepped piston 4 and at the other end by the lower end face of a plate 15 in which a valve needle 16 is slidably mounted which, in the illustrated position, closes an outlet channel 17 provided in and passing through the stepped piston 4.

Figure 2:
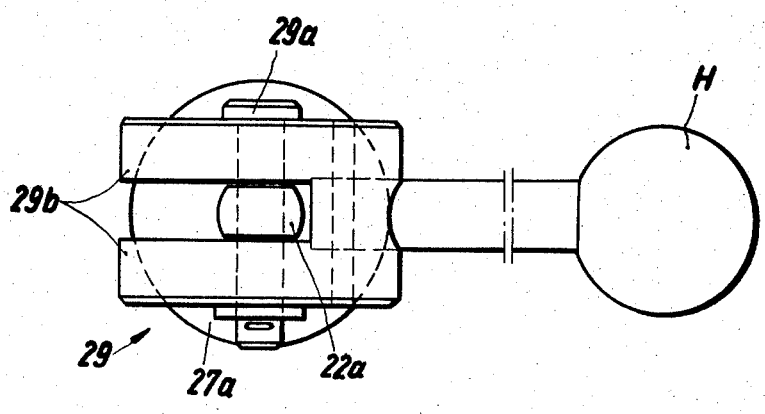
FIG. 2 is a top plan view of FIG. 1.

The plate 15 and needle 16 are sealed fluid-tightly by means of a packing 18a with respect to a control chamber 18 into which there extends an actuator member 19 which is connected for movement with the valve needle 16, for instance (but not necessarily) by being of one piece therewith. The member 19 is slidably mounted in a readily removable and exchangeable sleeve 20 and sealed by a gland 21. The member 19 has a diameter greater than that of the valve needle 16 and cooperates at its end remote from the latter with a tension bolt 22 which has associated with it (in the illustrated embodiment it is surrounded by) a spring 23 — which may be helical or constituted by a packet of Bellville springs — one end of which abuts against shoulder 24 of the bolt 22 and the other end of which abuts against a nut 25. A spring housing 27 has the interior bore 26 whose upper end is closed by the illustrated member 27a; the bore 26 is tapped and cooperates with exterior threads on the nut 25 which is located in it, so that the nut can be threaded into the bore 26 to a greater or lesser extent. A key (such as a Woodruff key) 28 extends through the nut 25 and is fixed in the bolt 22 so that turning movement of the latter will necessarily result in rotation of the nut 25. There is further provided an eccentric lever 29 which is pivotally connected at 29a with the portion 22a of bolt 22, (see also FIG. 2). Lever 29 is bifurcated and its arms 29a surround the portion 22a. It can be turned about pivot 29a by handle H and will then bear upon member 27a to mechanically relieve needle 16 relative to piston 4. The pretension of the spring 23 can readily be varied by threading the nut 25 more or less deeply into bore 26.

Channels 30 and 31 connect the control chamber 18 with the chamber 32, and via the latter of course with the non-illustrated user device — such as a spray gun, a nozzle or the like — which communicates with the chamber 32 via conduits or hoses connected to the outlet 11. This means that the fluid pressure prevailing at the user device is also present in the control chamber 18.

When the fluid pressure at the user device exceeds the value which has been predetermined for it for instance due to sudden termination of its operation, pressure increases in the chamber 32 and, via the channel 31, in the chamber 18. This fluid pressure acts upon the differential surface between members 16 and 19, in a sense lifting the member 19 upwardly against the opposition of the spring 23, and thereby moving the valve needle 16 in the same direction. This opens the channel 17 so that the latter can conduct away fluid from the chamber 14. As a result of this pressure deterioration in chamber 14, the piston 4 also moves upwardly due to the differential between the surface 5 and the diameter of seal 7. When piston 4 moves upwardly, tinlet 9 and outlet 6 can communicate. In the meanwhile, valve 3 has assumed closed position.

Pressure in the system composed of elements 18, 30, 31 and between the latter and the user device remains until the device resumes the use of pressure fluid. During this time, the communication between inlet 9 and outlet 6 permits a pump for the fluid to operate almost free of load.

When the user device again begins to draw pressure fluid, the pressure in 18, 21 and 32 drops so that spring 23 can displace members 19 and 16 against the seal of piston 4. Now, the chamber 14 is no longer in communication with outlet 6 via channel 17; instead, it receives pressure fluid from inlet 9 via bore 12. This causes piston 4 to move downwardly and to throttle the flow in conjunction with seal 5, at which time valve 3 responds to the pressure by opening, so that pressure fluid can move via chamber 32 to outlet 11 and from there to the user device, restoring in system 18,31,32 a pressure which maintains needle 16 at balance with reference to spring 23 and permits piston 4 to let as much pressure medium escape via seal 5 as is quantitatively determined by the system pressure in direction towards the user device.

It will be appreciated from what has been set forth above that the difference in the diameters of the member 19 on the one hand and of the valve needle 16 on the other hand determines the pressure at which the overflow valve 2 will respond, so that it is clearly possible to select a different response pressure simply by exchanging the unit composed of the members 16 and 19 against a different unit composed of similar members but which have a different diameter ratio. Such exchange is very simple, requiring for the removal of the elements 16, 19, 15 and 20 only that the housing 27 can be unscrewed, the elements be removed and new elements be put in their place whereupon the housing is threaded back into position. On installation the sleeve 20 engages with its open end a centering projecting 34 provided on the plate 15. Between the sleeve 20 and the plate 15 there is provided a sealing ring 35.

It will be understood that each of the elements described above, or two or more together, may also find a useful application in other types of constructions differing from the types described above.

While the invention has been illustrated and described as embodied in a pressure regulator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is set forth in the appended claims:

1. In a pressure regulator, in combination, a housing having a valve seat; an overflow valve accommodated in said housing and having a valve body configurated as a stepped piston having two spaced end portions one of which normally engages said valve seat, and a passage extending within said piston to the other of said end portions and communicating with the periphery of said piston via a throttling gap; a spring-loaded tension bolt in said housing; an actuating member of a first diameter and a valve needle member of a smaller second diameter fixed with said actuating member, both of said members being located in said housing intermediate said tension bolt and said other end portion of said piston; a removable sleeve slidably mounting said actuating member and having an open end facing said other end portion; an exchangeable plate slidably mounting and guiding said valve needle member and having a centering projection received in said sleeve through said open end, said plate defining within said sleeve a first chamber surrounding the juncture of said members, and further defining with said other end portion of said piston a second chamber which communicates with said passage and into which said valve needle members extends; an outflow channel extending through said piston from said other to said one end portion thereof, said outflow channel being normally closed by said valve needle member; fluid inlet means in said housing and communicating with said throttling gap; fluid outlet means in said housing and adapted to be connected with a user device; first passage means connecting said fluid inlet means with said fluid outlet means; and second passage means connecting said fluid outlet means with said first chamber so that the juncture of said members is subjected to the fluid pressure prevailing at the user device.

2. In a pressure regulator as defined in claim 1, said housing having a tapped bore accomodating said tension bolt with clearance; further comprising a nut having exterior screw threads meshing with the threads in said tapped bore and surrounding said tension bolt, and connecting means connecting said tension bolt and said nut for joint rotation; and wherein the biasing spring of said tension bolt surrounds the latter intermediate and has opposite ends bearing against said nut anxially spaced abutment shoulder on said tension bolt, respectively.

3. In a pressure regulator as defined in claim 1; further comprising a one-way valve interposed between said fluid outlet means and said first passage means.

4. In a pressure regulator as defined in claim 3, wherein said fluid outlet means has a center axis; and wherein said one-way valve has a valve member mounted for movement in direction at least substantially normal to said center axis.

5. In a pressure regulator as defined in claim 3, wherein said actuating member and said valve needle are of one piece with one another.

* * * * *